United States Patent [19]

Pai

[11] 4,382,248

[45] May 3, 1983

[54] REMOTE DEVICE FOR A MULTI-PHASE POWER DISTRIBUTION NETWORK COMMUNICATION SYSTEM

[75] Inventor: Stephen M. Pai, Six Forks, N.C.

[73] Assignee: Westinghouse Electric Corp., Pittsburgh, Pa.

[21] Appl. No.: 252,689

[22] Filed: Apr. 9, 1981

[51] Int. Cl.³ ............... H04Q 3/00; H04M 11/04; H04L 27/00

[52] U.S. Cl. ............... 340/310 A; 340/825.1; 377/39

[58] Field of Search ............ 340/310 A, 310 R, 825.1, 340/825.04, 825.52, 825.68, 168 S, 168 R; 329/104; 307/352, 353; 328/151; 375/85; 364/483

[56] References Cited

U.S. PATENT DOCUMENTS

| | | | |
|---|---|---|---|
| 3,602,826 | 8/1971 | List | 307/353 |
| 3,622,997 | 11/1971 | Casella | 340/825.1 |
| 3,911,415 | 10/1975 | Whyte | 340/310 A |
| 3,942,168 | 3/1976 | Whyte | 340/310 R |
| 3,967,264 | 6/1976 | Whyte et al. | 340/310 A |
| 4,065,763 | 12/1977 | Whyte et al. | 340/310 R |
| 4,109,100 | 8/1978 | Unkauf | 375/85 |
| 4,188,619 | 2/1980 | Perkins | 340/310 R |
| 4,241,311 | 12/1980 | Massey | 329/104 |
| 4,276,605 | 6/1981 | Okamoto et al. | 364/483 |

Primary Examiner—Donald J. Yusko

Attorney, Agent, or Firm—Robert E. Converse, Jr.

[57] ABSTRACT

A remote device for receiving communication signals carried by the phase conductors of a multi-phase power distribution network communication system is dislosed. The remote device includes a circuit for independently receiving each of the communication signals carried by the phase conductors. The receiving circuit produces an input signal having a serial format in response to each of the received communication signals. A clock circuit produces a train of clock pulses and a train of strobe pulses, each of the strobe pulses being produced in response to the production of a predetermined number of clock pulses. A serial-to-parallel shift register is responsive to each of the input signals. At the positive transition of each of the clock pulses, a sample value of each input signal is clocked into one of the serial-to-parallel shift register. Upon the production of each strobe pulse, the samples are transferred from each shift register to a latched storage register. Each strobe pulse also informs a microprocessor-based control logic circuit to read the samples from each of the latched storage registers. The samples are input to the control logic circuit in a parallel format. The control logic circuit reconstructs and processes the communication signals from the sample values of each of the input signals. The control logic circuit is responsive to the reconstructed, processed communication signals in accordance with the nature of the remote device.

5 Claims, 2 Drawing Figures

REMOTE DEVICE FOR A MULTI-PHASE POWER DISTRIBUTION NETWORK COMMUNICATION SYSTEM

BACKGROUND OF THE INVENTION

1. Field of the Invention

This invention is related generally to remote devices which are components of a three-phase power distribution network communication system, and more specifically, to improved sampling circuits for such remote devices.

2. Description of the Prior Art

Considerable effort has been devoted in recent years to develop power distribution network carrier communication systems due to the increased desirability of performing certain automated functions, such as the automatic reading of utility meters, selective load control, performing load continuity checks, and the like. U.S. Pat. Nos. 3,967,264; 3,942,168; and 3,911,415 and U.S. patent application Ser. No. 252,682 filed Apr. 9, 1981, all assigned to the assignee of the present invention, disclose some form of communication system via the power distribution network of an electric utility. The communication systems disclosed in the aforementioned patents and patent application allow an electric utility to communicate with a variety of remote devices by using the power distribution network for carrying the communication signal.

It is known in the prior art that in situations where multi-conductor service is provided to customer locations, the performance and reliability of the communication system may be improved by using each of the phase conductors as a communication path. In these types of communication systems, each of the phase conductors carries an identical communication signal. Examples of power distribution network communication systems having a communication signal coupled to each of the phase conductors are U.S. Pat. No. 4,065,763; U.S. patent application Ser. No. 252,681 filed Apr. 9, 1981 which are both assigned to the same assignee as the present invention, and U.S. Pat. No. 4,188,619.

Although the coupling of the communication signal to each of the phase conductors improves the reliability and performance of the communication system, it increases the complexity of the receiving remote devices since the remote devices must now be responsive to more than one communication signal. This has caused problems in devices such as signal repeaters which are coupled to each of the three-phase conductors. Microprocessor-based signal repeaters which could receive and process a single communication signal must now receive and process three identical communication signals. In many applications, it has been discovered that the time required for sampling and reconstructing each of the communication signals is so long that the microprocessor-based remote device does not have sufficient time for processing the received signals. This problem has led design engineers to use larger or faster microprocessors which causes both the complexity and the price of the remote devices to increase.

SUMMARY OF THE PRESENT INVENTION

The present invention is for a remote device for receiving a communication signal coupled to, and carried by, each of the phase conductors of a three-phase power distribution network communication system. The remote device has a novel sampling circuit which assumes the burden of sampling each of the received communication signals and preparing the samples for input to the microprocessor, thus resulting in a considerable savings of time which can be used by the microprocessor for processing the received communication signals.

The remote device is comprised of a circuit for independently receiving each of the communication signals carried by the phase conductors. The receiving circuit produces an input signal having a serial format in response to each of the received communication signals. A clock circuit produces a train of clock pulses and a train of strobe pulses, with each of the strobe pulses being produced in response to the production of a predetermined number of the clock pulses. The sampling circuit is comprised of a plurality of serial to parallel shift registers each having a latched output stage. Each of the shift registers is responsive to one of the input signals and produces sample values of the input signal in response to each of the clock pulses. The sample values are transferred to, and latched by, the output stage of each shift register in response to each of the strobe pulses. In this manner, each of the shift registers produces a sample value having a parallel format in response to one of the input signals.

A microprocessor-based control logic circuit is used for reconstructing and processing the received communication signals from the sample values produced by the sampling circuit. The control logic circuit receives the strobe pulses from the clock circuit and produces address signals identifying each of the shift registers. The control logic circuit uses the address signals to read the sample values produced by each of the shift registers. This allows the microprocessor-based control logic circuit to reconstruct and process the received signals in response to a much smaller number of parallel formatted sample values rather than a large number of serially-formatted sample values. The microprocessor-based control logic circuit therefore has a considerably longer period of time for processing the received communication signals due to the operation of the sampling circuit.

DESCRIPTION OF THE PREFERRED EMBODIMENT

Figure 1:
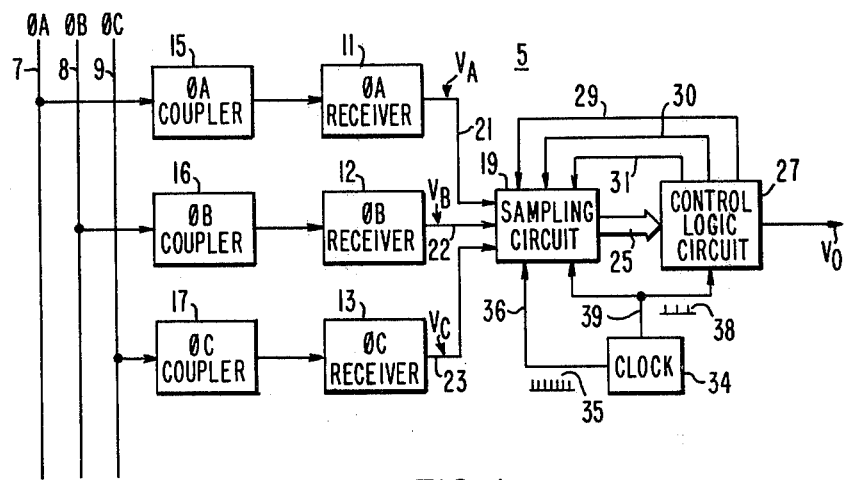
FIG. 1 is a block diagram illustrating a remote device in a three-phase power distribution network communication system constructed according to the teachings of the present invention.

Turning to FIG. 1, a block diagram illustrating a remote device 5 constructed according to the teachings of the present invention is shown. The remote device 5 is a component of a three-phase power distribution network communication system. The communication system utilizes a utility's power distribution network for carrying the communication signal. The utility's power distribution network is comprised of a plurality of interconnected conductors. A small portion of a utility's power distribution network is shown in FIG. 1, which illustrates a phase A conductor 7, a phase B conductor 8, and a phase C conductor 9.

The remote device 5 has a phase A receiver 11, a phase B receiver 12 and a phase C receiver 13 connected to the phase A conductor 7, the phase B conductor 8 and the phase C conductor 9 through a phase A coupler 15, a phase B coupler 16, and a phase C coupler 17, respectively. In the communication system in which the remote device 5 is intended for use, each of the phase conductors carries an identical communication signal. The phase A receiver 11 produces an input signal $V_A$ responsive to the communication signal carried by the phase A conductor 7. Similarly, the phase B receiver 12 produces an input signal $V_B$ responsive to the communication signal coupled to the phase B conductor 8; the phase C receiver 13 produces an input signal $V_C$ responsive to the communication signal carried by the phase C conductor 9. The couplers 15, 16 and 17 and the receivers 11, 12 and 13 may be of a type as described in U.S. patent application Ser. No. 252,664 filed Apr. 9, 1981, which is assigned to the same assignee as the present invention. The input signals $V_A$, $V_B$ and $V_C$ have a serial format. The couplers 15, 16 and 17 and the receivers 11, 12 and 13 are not important features of the present invention.

A sampling circuit 19 receives the first input signal $V_A$ which is carried by a conductor 21. Similarly, the sampling circuit 19 receives the second input signal $V_B$ which is carried by a conductor 22 and the third input signal $V_C$ which is carried by a conductor 23. A plurality of parallel output conductors 25 connect the sampling circuit 19 to a microprocessor-based control logic circuit 27. The control logic circuit 27 produces a first, a second and a third address signal which are input to the sampling circuit 19 by conductors 29, 30 and 31, respectively. The control logic circuit 27 produces an output signal $V_O$. The reader should recognize that the output signal $V_O$ may be any of a large variety of formats for performing a large variety of functions depending upon the nature of the remote device 5.

Concluding the description of the block diagram of FIG. 1, a clock circuit 34 produces a train of clock pulses 35 which are input to the sampling circuit 19 by a conductor 36. The clock circuit 34 also produces a plurality of strobe pulses 38 which are input to both the sampling circuit 19 and the control logic circuit 27 by a conductor 39. The operation of the sampling circuit 19 is controlled by the train of clock pulses 35, the plurality of strobe pulses 38 and the first, second and third address signals. The operation of the sampling circuit 19 is an important feature of the present invention and is described in detail hereinafter.

Figure 2:
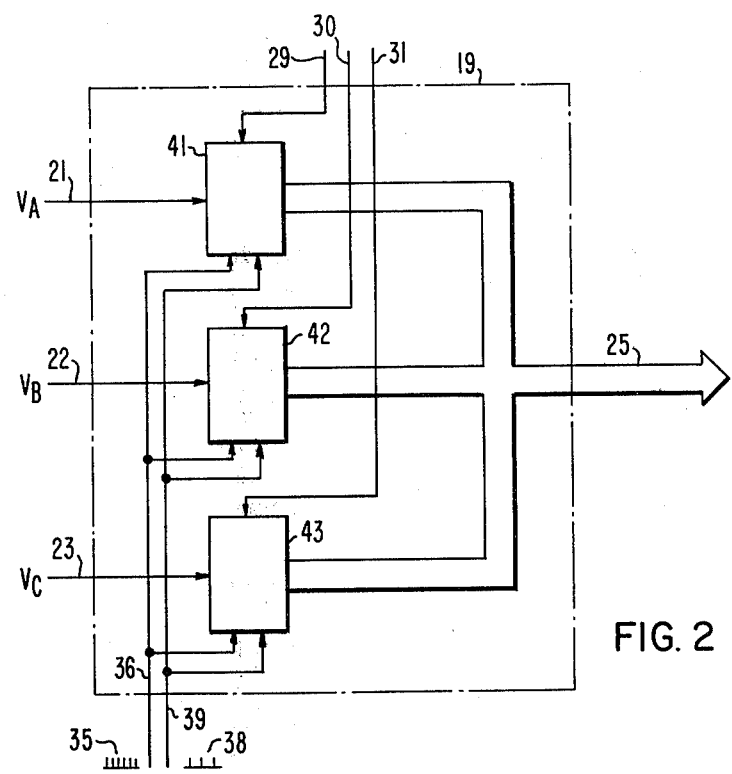
FIG. 2 is an electrical schematic illustrating the circuit details of the sampling circuit shown in FIG. 1.

In FIG. 2, an electrical schematic illustrating the circuit details of the sampling circuit 19 is shown. The sampling circuit 19 is comprised of a first shift register 41, a second shift register 42 and a third shift register 43. Each of the shift registers 41, 42 and 43 is a serial-to-parallel shift register of the type represented by Style Number CD4094B. Each shift register has a latched output stage and tri-stated parallel output terminals. The first shift register 41 receives the first input signal $V_A$ carried by the conductor 21, the first address signal carried by the conductor 29, the train of clock pulses 35 carried by the conductor 36 and the plurality of strobe pulses 38 carried by the conductor 39. The parallel output terminals of the shift register 41 are tied to the plurality of parallel output conductors 25.

In a similar fashion, the second shift register 42 receives the second input signal $V_B$ carried by the conductor 22, the second address signal carried by the conductor 30, the train of clock pulses 35 carried by the conductor 36 and the plurality of strobe pulses 38 carried by the conductor 39. The parallel output terminals of the second shift register 42 are tied to the plurality of parallel output conductors 25. Finally, the third shift register 43 receives the third input signal $V_C$ carried by the conductor 23, the third address signal carried by the conductor 31, the train of clock pulses 35 carried by the conductor 36 and the plurality of strobe pulses 38 carried by the conductor 39. The parallel output terminals of the third shift register 43 are tied to the plurality of parallel output conductors 25.

In operation, the shift registers 41, 42 and 43 produce sample values of the input signals $V_A$, $V_B$ and $V_C$, respectively, in response to each pulse of the train of pulse signals 35. At the positive transition of each pulse of the train of pulse signals 35, the binary value (zero or one) of the input signal $V_A$ is clocked into the first shift register 41. Similarly, at the positive transition of each pulse of the train of pulse signals 35, the binary values of the input signals $V_B$ and $V_C$ are clocked into the second shift register 42 and the third shift register 43, respectively.

Each strobe pulse is produced in response to the production of a predetermined number of clock pulses. For an eight bit shift register, a strobe pulse would be produced in response to the production of eight clock pulses. The strobe pulses are used to transfer the samples to the latched output stages of each of the shift registers 41, 42 and 43. In this way, the shift registers 41, 42 and 43 sample the serially formatted input signals $V_A$, $V_B$ and $V_C$ and produce parallel formatted sample values of each signal. The sample values are available at the latched output stages of each shift register until they are replaced by a new set of sample values in response to a new strobe pulse.

While the sample values are available at the output terminals of each of the shift registers 41, 42 and 43, the control logic circuit 27 individually reads each of the parallel formatted sample values. This is accomplished by having each strobe pulse input to the control logic circuit 27 which indicates that new sample values are available. The control logic circuit 27 produces the first, second and third address signals for reading the sample values produced by the first, second and third shift registers 41, 42 and 43, respectively. Thus, the control logic circuit 27 is interrupted only one time instead of eight times as would be required for producing sample values from the serially-formatted input signals. The time saved by the sampling circuit 19 may be used by the control logic circuit 27 to process the received signals.

A prototype of the present invention was built using an MC6802 microprocessor as the basis for the control logic circuit 27. The NMI interrupt was used to obtain the sample values. The microprocessor was interrupted eight times for receiving sample values for each of the input signals under the prior art method. Each interrupt consumed 68 microseconds with the eighth interrupt consuming 85 microseconds. The eight interrupts for each input signal consumed 561 microseconds out of a total allotted 3.2 milliseconds for processing each input signal. This resulted in the microprocessors spending approximately 17% of its allotted time for the production of sample values. By using the sampling circuit 19 of the present invention, only one NMI interrupt is needed per input signal. By using the sampling circuit 19 of the present invention, approximately 95% of the sampling time was saved, which was subsequently utilized by the microprocessor for processing the received signals.

The description of the remote device 5 is general in nature since the sampling circuit of the present invention may be used with a variety of remote devices which are intended for receiving multiple communication signals. Those skilled in the art will recognize that the remote device 5 may be a signal repeater, a load management device, or the like. It is anticipated that alternative embodiments of the present invention may be conceived which fall within the spirit and scope of the following claims.

What I claim is:

1. A remote device for receiving multiple communication signals carried by the phase conductors of a multi-phase power distribution network communication system, comprising:

means for independently receiving each of said communication signals carried by said phase conductors, said means producing an input signal having a serial format in response to each of said received communication signals;

means for producing a train of clock pulses and a train of strobe pulses, each of said strobe pulses produced in response to the production of a predetermined number of said clock pulses;

a plurality of serial to parallel shift registers each producing a sample value of one of said input signals in response to each of said clock pulses, each of said shift registers having a latched output for receiving said sample values in response to each of said strobe pulses and for presenting said sample values in a parallel format; and control logic means for reconstructing said communication signals in response to said parallel formatted sample values, said control logic means being responsive to said reconstructed communication signals.

2. The remote device of claim 1 including means for independently coupling the means for receiving to each of the phase conductors.

3. The remote device of claim 1 wherein the train of strobe pulses is input to the control logic means, and wherein said control logic means produces a plurality of address signals for addressing and reading each of the serial-to-parallel shift registers in response to each of said strobe pulses.

4. The remote device of claim 1 wherein each of the strobe pulses is produced in response to the production of eight clock pulses.

5. The remote device of claim 1 wherein said control logic means comprises a microprocessor having an interrupt terminal, said strobe pulse means is connected to said microprocessor interrupt terminal, and wherein each of said strobe pulses produces an interrupt to said microprocessor to cause said microprocessor to produce a plurality of address signals for addressing and reading each of said latched outputs.

* * * * *